S. B. Crawford.
Bee Hive
Nº 93,418. Patented Aug. 10, 1869.
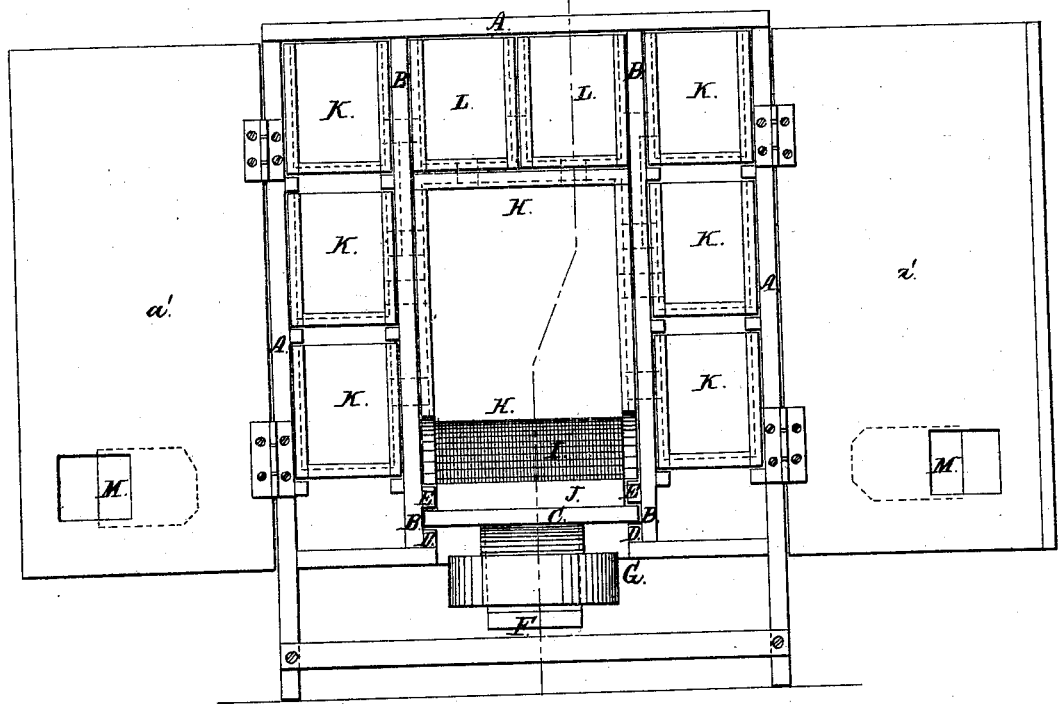
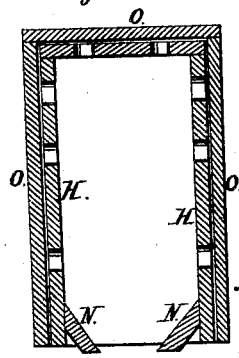
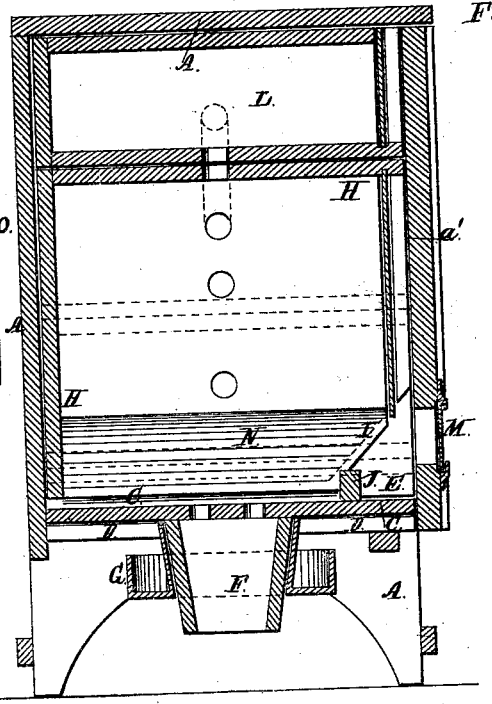
Witnesses.
O. Hinchman
Jno. H. Brooks
Inventor.
S. B. Crawford
per Munn & Co
Attorneys.

United States Patent Office.

SAMUEL B. CRANFORD, OF UPPER MARLBOROUGH, MARYLAND.

Letters Patent No. 93,418, dated August 10, 1869.

IMPROVEMENT IN BEE-HIVES.

The Schedule referred to in these Letters Patent and making-part of the same.

*To all whom it may concern:*

Be it known that I, SAMUEL B. CRANFORD, of Upper Marlborough, in the county of Prince George's, and State of Maryland, have invented a new and useful Improvement in Bee-Hives; and I do hereby declare that the following is a full, clear, and exact description thereof, which will enable others skilled in the art to make and use the same, reference being had to the accompanying drawing, forming part of this specification, in which—

Figure 1 is a front view of my improved hive, the hinged front being opened.

Figure 2 is a detail sectional view of the same, taken through the line x–x, fig. 1.

Figure 3 is a detail cross-section of the hiving-box, showing the guard-frame upon it.

Similar letters of reference indicate corresponding parts.

My invention has for its object to improve the construction of bee-hives, so as to make them more convenient in use; and It consists in the construction and combination of various parts of the hive, as hereinafter more fully described.

A is the outer casing or box of the hive, the ends of which are extended down, to form feet, and the front of which is made in two parts a', hinged at their outer edges to the front edges of the ends, as shown in fig. 1.

The interior of the hive is divided into three compartments, by the vertical partitions B.

C is the bottom, which slides in grooves, formed by attaching cleats D E to the partitions B, at their lower ends, so that the said bottom may be conveniently slid in and out.

Through the middle part of the bottom C are formed one or more holes, through which the bees enter.

F is the entrance-tube, which I prefer to make tapering, and the upper or larger end of which is securely attached to the under side of the bottom C, around the entrance opening in said bottom.

G is an insect trap, attached to and surrounding the entrance-tube F, and which is designed to be filled with water or other liquid, to guard against the entrance of crawling insects, at the only point at which they could possibly enter.

H is the hiving-box, the bottom of which is left open, and the lower edges of the sides of which rest upon the cleats E.

The front edges of the sides of the hiving-box H are bevelled off, as shown in figs. 1 and 2, and to the inclines thus formed is attached a strip of wire gauze, I, so that the hiving-box H may be ventilated from its front.

The opening at the lower edge of the wire gauze I is closed by the cleat J, attached to the forward part of the bottom C.

The front of the hiving-box H, above the wire-gauze I, is formed of a glass plate, as shown in fig. 2.

K are honey-boxes, which are placed one above the other in the side compartments of the box A, and which rest and slide out and in upon cleats attached to the sides of the box A, and to the partitions B, as shown in fig. 1.

The bees enter the lower honey-boxes K from the hiving-box H, through holes formed through the sides of the said box H, through the partitions B, and through the sides of the honey-boxes K. The bees enter the upper honey-boxes K, through holes in the sides of the hiving-box H, through a channel in the partitions B, and through holes in the sides of the honey-boxes K, as shown in dotted lines in figs. 1 and 2.

L are honey-boxes, placed in the upper part of the hive A, above the hiving-box H, and which may rest upon the top of the said hiving-box H, or upon a horizontal partition, the edges of which may be attached to the partitions B.

The bees enter the honey-boxes L, through holes in the top of the hiving-box H, and in the bottoms of the honey-boxes L, as shown in fig. 2, and in dotted lines in fig. 1.

In the lower part of the doors or hinged fronts a', directly opposite the wire gauze I, are formed openings, covered with slides M, to allow the hive to be ventilated when required.

To the lower edge of the sides of the hiving-box H are attached cleats N, inclining inward and downward, to prevent the sliding bottom C from being gummed to its place, so that it may be always easily taken out and put in when required.

O is a frame, formed of an end and two side-pieces, to be put over the hiving-box when out of the hive, to cover and close the openings through the sides and top of said box, as shown in fig. 3.

Having thus described my invention;

What I claim as new, and desire to secure by Letters Patent, is—

1. The combination with the slides M, in the doors a' a', of the wire gauze I, in the front of the hiving-box, substantially as, and for the purpose specified.

2. The combination of the inclined cleats N, with the lower side edges of the hiving-box H, and with the sliding bottom C, substantially as herein shown and described, and for the purpose set forth.

SAMUEL B. CRANFORD.

Witnesses:
I. E. SHEKELL,
LEWIS SIX.